United States Patent Office 3,499,959
Patented Mar. 10, 1970

3,499,959
THERAPEUTIC TETRACYCLINE PREPARATION HAVING DELAYED THERAPEUTIC ACTION AND PROCESSES FOR THE PRODUCTION OF SAID PREPARATION
Murray E. Corn, Massapequa, N.Y., assignor to Chemical and Pharmaceutical Patent Holding Ltd., Neugasse, Switzerland
No Drawing. Filed July 5, 1966, Ser. No. 562,516
Int. Cl. A61k 9/00, 21/00, 27/12
U.S. Cl. 424—22                          6 Claims

ABSTRACT OF THE DISCLOSURE

A slow release pharmaceutical preparation comprising tetracycline or a derivative thereof, an agent such as polyvinylpyrrolidone which permits only slow and uniform release of the tetracycline, and a carboxylic acid of relatively low solubility.

---

This invention relates to therapeutic compositions containing tetracycline and its derivatives and to methods for the production of such compositions.

More particularly, this invention is directed to therapeutic compositions of the above class which have long-lasting pharmaceutical action.

Pharmaceutical products having long-lasting action have become more and more important during the last decade and are very desirable therapeutically. In many products the release of the active substance in the body is extremely irregular. On the one hand, the rate of release of the active substance may be higher than desired so that substantially all the active ingredients are released and absorbed within the shortest interval incurring the possibility of overdosage, while on the other hand the release rate may be too low or the dissolution rate insufficient so that absorption is too low and important amounts of the active substances are eliminated unchanged and unused.

If uniform levels of therapeutic action are desired, administrations of the drug must be repeated often. To avoid such troublesome repetitions, incorporation of active ingredients in larger amounts and in less soluble forms for utilization in the body have been attempted. Thereby, the active ingredients are then delivered to the blood slowly in smaller doses over a longer period of time.

Pharmaceutical preparations which are administered orally should be able to maintain therapeutic concentrations over a longer period of time in the body fluids, preferably in the blood. These preparations should only be disintegrated partially in the gastric juices giving a fairly high initial blood level, and then the remainder should dissolve slowly in the intestinal tract, thereby being absorbed in small useful doses over a longer period of time in to the blood stream.

The introduction of such long acting medicaments has been achieved with penicillin in a fairly satisfactory way.

The art has chosen several different ways to achieve this aim. With penicillin, for instance, a compound procaine-penicillin has been prepared which is relatively water soluble. The compound remains in the blood for a longer time, due to its lower solubility, so that the number of administrations can be reduced.

A similar effect is also obtained with penicillin by coating an orally administrated solid preparation with different films.

To obtain the same effect for tetracycline the known methods have not been successful, which is understandable because of the physical and chemical characteristics of tetracycline.

Tetracycline and its derivatives, chlorotetracycline, oxytetracycline and dimethyltetracycline are bases and as such are very difficultly soluble in water; at least, they are not sufficiently soluble to obtain a favorable therapeutic effect.

The hydrochloride salts of tetracycline and its derivatives have a better solubility in water and solutions thereof are used for subcutaneous injections, and for oral administration.

However, the hydrochloride preparation has a great disadvantage because it is strongly hydrolyzed in a neutral aqueous solution and therefore this also happens in the body fluids. Tetracycline hydrochloride decomposes quickly at a pH value of 3–7.5 to form the tetracycline base which precipitates due to its low solubility in water. However, in the acid medium of the gastric juices it remains in solution and is very quickly absorbed so that high initial concentrations of tetracycline are obtained in the blood. However, this action is of short duration. This indicates that the greater part of the tetracycline hydrochloride has already been resorbed in the stomach.

The preparation according to the invention prevents the tetracycline preparation from being completely absorbed in the stomach; therefore, it is partially resistant to the stomach medium. Consequently, it does not result in initial concentrations in the blood which, soon after absorption, drop off rapidly. The process according to the invention delays the disintegration of the preparation in the gastric juices, so that the portion which has not disintegrated passes into the intestinal tract. This portion slowly disintegrates in the intestinal tract and releases the active ingredient into the blood over a prolonged period of time.

Compounds which show as good solubility characteristics as the hydrochloride are amino-methyl compounds in the form of free bases or acid salts. These are not subject to hydrolysis. However, the action of this easily water-soluble form is also completely resorbed in the stomach and causes relatively high initial concentrations in the blood, which are also of very short duration.

The action of the tetracycline base having a low water solubility is of short duration too; the free base is mostly changed in the acid gastric juice into the water soluble hydrochloride and has the same general behavior in the gastric juices as the salt.

Tetracycline and its derivatives, either as acid salts or free bases, are resorbed quickly in the stomach, so that only initial concentrations are obtained in the blood and the therapeutic action therefore is of short duration.

The amphoteric character of tetracycline makes it very difficult to produce chemically a tetracycline preparation with prolonged activity.

This problem is solved by the process according to the invention which is characterized by mixing tetracycline, its derivatives or salts with an alcoholic solution of polyvinylpyrrolidone, an arsenic-free shellac and a relatively low solubility non-toxic organic acid. This mixture is then granulated and the granules thus obtained are coated with a film of a solution of alcoholic polyvinylpyrrolidone and arsenic-free shellac solution.

The tetracycline hydrochloride preparation produced by the process is characterized in that it consists of a matrix formed of tetracycline or a derivative or a salt thereof, polyvinylpyrrolidone, shellac, and the low solubility organic acid, the matrix being covered with a coating which is free of active ingredient.

As an amphoteric substance, tetracycline forms salts with acids as well as with bases. With hydrochloric acid it forms a hydrochloride, the solutions of which are strongly subject to hydrolysis in a neutral medium.

Tetracycline bases which have precipitated above a pH value of 3 are very difficultly soluble. Therefore, absorption is limited to very small amounts which are not sufficient to produce effective blood levels.

Together with polyvinylpyrrolidone, tetracycline as well as its derivatives and its salts form a chemical complex which can be split again under the mildest conditions, the active ingredient thus becoming sufficiently soluble and therefore being absorbed with greater ease. As soon as the active ingredient is freed, depending upon the pH, conditions tending to hydrolyze the acid salt to the base predominate. However, due to the presence of the organic acid which is mixed with the tetracycline, hydrolysis is hindered. As soon as the hydrochloride comes into a region with a pH value of 3 or more, such as upon leaving the stomach, the medium is influenced by the organic acid in such a way that the pH value of the fluid surrounding the hydrochloride will never exceed a pH value which would permit hydrolysis of the tetracycline and, thereby, precipitation of the free base. The tetracycline freed from the complex remains in contact with the organic acid, which results in keeping the pH value of the surrounding media sufficiently low so that the solubility of the tetracycline is maintained and the hydrochloride of the tetracycline remains intact.

The amounts of tetracycline freed from the complex of tetracycline and polyvinylpyrrolidone are very small at any given time. For the purpose of obtaining this effect, an organic acid is employed which is only slightly soluble in neutral or acid media. An acid which is very soluble is dissolved too fast. Therefore, an organic acid is used which will remain with the active ingredient throughout the entire gastro-intestinal tract.

Suitable acids are carboxylic acids of relatively low solubility, and low toxicity, such as fumaric, adipic, succinic, sorbic, etc.

By relatively low solubility acids are meant acids having a solubility of less than 10 g. in 100 g. of water.

The weight relationship between the tetracycline or its derivative, the polyvinylpyrrolidone and the organic acid is 10:.10–20:.10–.20.

The presence of the organic acid which remains with the active ingredient throughout the entire gastro-intestinal tract results in still another advantage. In this regard it is known that after a certain time after administration, as much as 50% of tetracycline base or hydrochloride are found unused in the feces. The preparation according to this invention makes it possible that the tetracycline is substantially completely absorbed, so that only relatively small amounts can be traced in the feces. This makes it possible that, with the preparation of this invention, one can administer for a given period of time less tetracycline than with the usual tetracycline preparations. Oridinarily, repetitive administrations of the normal dose are required every 6 hours, whereas it is sufficient if the preparation according to the invention, containing the same dose of active ingredient, is administered every 12 hours, reaching thereby a constant blood level. Thus, the quantity of tetracycline for administration according to the invention is greatly reduced. This is confirmed by clinical analyses which will be given hereinafter.

It therefore is a feature of the invention to produce a tetracycline preparation which requires the administration of substantially reduced quantities of active substance to achieve the same therapeutic effect.

Another advantage of the preparation according to the invention is found in its effect on the intestinal flora. It is known that all antibiotics taken orally, including tetracycline, are harmful to the intestinal flora. This results in known side effects, such as diarrhea, etc. For this reason, much antibiotic therapy consists of intramuscular injection (i.e., administration outside the gastro-intestinal tract). However, this method has its limits. For instance, in underdeveloped countries oral administration remains the only practical method. However, in these areas the patient will often only take the oral administration in a hospital or clinic and has been known to throw away the medication in which the dose must be repeated every 4–6 hours. The preparation according to the invention, by virtue of its required administration only every 12 hours insures greater therapeutic control.

According to the process of the invention, a tetracycline preparation is produced which results in a sustained, uniform release of active ingredient throughout the entire gastro-intestinal tract. Therefore, nowhere in the gastro-intestinal tract is there produced a high concentration of active antibiotic ingredient.

The active antibiotic substance is slowly released throughout the entire gastro-intestinal tract and it is slowly absorbed during a period of up to 12 hours.

Thereby, the following advantages are obtained:

(a) A single-dose sustained-release effect never before achieved with tetracycline is obtained.
(b) The intestinal flora remains basically unaffected and unharmed, because the local concentrations in the intestines are very low.

As suitable fillers, talc and silicates of low bulk density are used, because the granules would be too heavy if talc alone were used.

The following examples serve to illustrate the preparation of the granules and the dosage form.

The following mixture is prepared:

|  | G. |
|---|---|
| Tetracycline | 1,000 |
| Fumaric acid | 150 |
| An infusorial earth substance used as a lubricant, such as Syloid | 5 |
| Talc | 5 |
| Total | 1,160 |

The following solution is prepared:

20% polyvinylpyrrolidone in isopropyl alcohol, w./w.
40% shellac in isopropyl alcohol, w./w.

The above mixture, which is in powder form, is granulated with a mixture consisting of 270 ml. of the 20% polyvinylpyrrolidone solution and 130 ml. of the 40% shellac solution. It is then passed wet through a 20 mesh sieve.

The granulation product is dried at a temperature between 30 and 40° C. in a vacuum. The dried granules are then sieved using a 16–50 mesh sieve. The resulting granules between 16 and 50 mesh have a yield of 60–75%.

The dry granules are placed in a rotating coating pan and are wetted regularly in the pan with a solution consisting of 85 parts 20% polyvinylpyrrolidone solution and 15 parts of 40% shellac solution, until 1400 ml. in total has been used.

There is then prepared the following:

|  | G. |
|---|---|
| Tetracycline hydrochloride | 1,500 |
| Fumaric acid | 225 |
| Syloid | 75 |
| Total | 1,800 |

The above mixture is applied in small portions to the wetted granules until the whole amount has been consumed.

After each application the granules are dried by the introduction of hot air into the pan.

During this phase of the operation no talc is used, as it would make the granules too heavy. The granules so produced are sieved between 20 and 40 mesh and are vacuum dried at 30° C.

The parts which have been retained on the 20 mesh sieve or passed through the 40 mesh sieve are completely recycled in the next batch.

The granule thus produced is finally covered with a coating which is free of active ingredient, The covering may consist of 300 ml. of a solution containing one part 20% polyvinylpyrrolidone and 9 parts 40% shellac applied in 6 to 9 applications.

The granules are dried through hot air in the pan, so that no special drying is necessary.

1 g. of the granulate contains between 500 and 600 mg. of tetracycline hydrochloride.

The above procedure is also applicable with derivatives of tetracycline, such as oxytetracycline, chlorotetracycline, dimethyltetracycline, and their amino-methyl derivatives and salts and mixtures thereof.

It is to be noted that the final granules are comprised of a core and a plurality of layers containing a mixture of antibiotic substance, polyvinylpyrrolidone, shellac and fumaric acid, and a grossing coating which is free of active ingredient, said core having a higher concentration of antibiotic substance in comparison with said layers.

The granules have been tested with animals to determine the release rate of the active tetracycline ingredient. This has been effected by measuring the quantity of tetracycline in the blood serum of the animals over a 12-hour period of time. This has been compared with blood serum levels in animals in which conventional tetracycline preparations are administered. The results are shown in the following table (Table I). Therefrom it will become apparent that the oral composition of the present application supplies tetracycline for a 12-hour period in the bloodstream, whereas the conventional ingredient is no longer present in the bloodstream after 6 hours.

TABLE I
Micrograms/ml. tetracycline found in the blood serum of dogs

| | Comparative tests with conventional tetracycline hydrochloride, 10/65 of 250 mg./capsule | | Tests with the preparation of tetracycline hydrochloride according to the application, 10/65 of 250 mg./capsule | | |
|---|---|---|---|---|---|
| | Group | | | Group | |
| Hours after administration | 1 | 2 | Hours after administration | 3 | 4 | 5 |
| 0 | 0 | 0 | 0 | 0 | 0 | 0 |
| 2 | 0.210 | 0.236 | 2 | 0.367 | 0.636 | 0.236 |
| 3 | 0.236 | 0.200 | 3 | 0.450 | 1.360 | 0.376 |
| 4 | 0.150 | 0.200 | 4 | 0.480 | 1.080 | 0.420 |
| 6 | 0.150 | 0.159 | 6 | 0.284 | 0.850 | 0.400 |
| 8 | 0.000 | 0.000 | 8 | 0.256 | 0.570 | 0.256 |
| 10 | 0.000 | 0.000 | 10 | 0.200 | 0.450 | 0.268 |
| 12 | 0.000 | 0.000 | 12 | 0.168 | 0.450 | 0.284 |

The following clinical studies have been conducted in order to establish the effectivity and reliability of the substances produced according to the invention. For this purpose the composition which is employed is that produced in the above example, wherein each gram of granulate contains 500–600 mg. of tetracycline hydrochloride.

These studies were conducted on hospitalized patients suffering from repeated infections and requiring treatment with an antibiotic substance. Tetracycline was selected as the appropriate antibiotic substance. The patients were given the composition according to the invention and the blood serum levels of the tetracycline were evaluated. Comparison was made with other patients receiving conventional tetracycline.

In order to determine the presence of any adverse side effects, the patients received the preparation according to the application for periods of 8 to 11 days. Normal prescribed treatment with conventional tetracycline is generally 4 and 5 days, in which period patients usually respond.

The response of the patients to the tetracycline preparation according to the invention was found to be as effective as that with the conventional tetracycline and completely free of side effects.

An important feature of the invention became apparent from the testing namely, that equal effectivity of the substance according to the invention was obtained as compared to that of conventional tetracycline, even though approximately half the active antibiotic substance was administered in each 24 hour day.

TABLE II
Micrograms/ml. of tetracycline found in the blood serum of patents receiving tetracycline according to the application

| | A | B | C | K |
|---|---|---|---|---|
| | 500 mg. stat, 250 mg. q. 12 h. | 500 mg. stat, 250 mg. q. 12 h. | 500 mg. stat, 500 mg. q. 12 h. | 250 mg. stat, 250 mg. q. 12 h. |
| | Blood serum levels for 1st 24 hrs. following administration | Blood serum levels for 2nd 24 hrs. following administration | Blood serum levels for 1st 24 hrs. following administration | Blood serum levels for 1st 24 hrs. following administration |
| Hours after administration: | | | | |
| 1 | .35 | 1.24 | 0.14 | .32 |
| 2 | .58 | 1.34 | 0.66 | .42 |
| 5 | .86 | 1.28 | 1.33 | .36 |
| 8 | .98 | 1.22 | 1.14 | .32 |
| 12 | .93 | 1.08 | 1.00 | .26 |
| 13 | 1.02 | 1.04 | 1.24 | .35 |
| 14 | 1.28 | 1.00 | 1.80 | .52 |
| 18 | 1.57 | 0.87 | 2.58 | .48 |
| 24 | 1.14 | 0.59 | 2.40 | .42 |
| Urine Levels: | | | | |
| 5 | 7 | | 19.5 | Determination of the tetracycline quantities was made by the method of K. W. Kohn in "Analytic Chemistry" Vol. 33 No. 7 (1961) page 862. |
| 11 | 12 | | 39.5 | |
| 19 | 15 | | 54.0 | |
| 23 | 28 | | 46.0 | |

This is apparently due to the more thorough utilization of the tetracycline in the preparation according to the invention as compared to the conventional tetracycline. This has been explained hereinbefore in the application.

Table II, above, gives the quantity of tetracycline measured in the blood serum for three groups of patients.

Patient Group A was given 500 mm. of active substance initially and 250 mm. thereafter, every 12 hours (500 mg. stat., 250 mg. q. 12 h.). The blood serum levels which are given are for the first 24 hours.

Patient Group B was given 500 mg. initially and 250 mg. thereafter, every 12 hours, and the blood serum levels are for the second 24 hours.

Patient Group C was given 500 mg. initially and 500 mg. every 12 hours thereafter, and the blood levels are for the first 24 hours. This group was given increased dosage of active substance since they represented severe cases. Normal medical treatment with conventional tetracycline would have called for double the ordinary dosage, i.e., 250 mg. every 6 hours.

Also shown in Table II is the quantity of tetracycline present in the urine.

From the aforegoing Table II it is seen that the quantity of tetracycline in the blood serum extends over the 12 hour periods of administration and can be built up as shown in the case of Patient Groups A and B.

Blood serum levels were then evaluated for patients receiving the preparation according to the invention in comparison with patients receiving conventional tetracycline.

This is shown in Table III, wherein patients D and E received 500 mg. of the preparation according to the application to start and thereafter 250 mg. thereof every 12 hours.

Patients F were given 500 mg. of the preparation according to the application to start and 500 mg. every 12 hours thereafter. The blood serum levels for patients D and F are in the first 24 hours, while those for the patients E are in the second 24 hours.

Patients G, H and J received conventional tetracycline in amounts of 250 mg. to start and 250 mg. every 6 hours. Patients G and H show the blood serum levels for the first 24 hours, while patients J show the blood serum levels in the second 24 hours.

TABLE III

Micrograms/ml. of tetracycline found in the blood serum of human patients

| | Patients receiving tetracycline preparation according to the application | | | Patients receiving conventional tetracycline (250 mg. every 6 hours) | | |
|---|---|---|---|---|---|---|
| | D | E | F | | | |
| | 500 mg. stat, 250 mg. q. 12 h. | 500 mg. stat, 250 mg. q. 12 h. | 500 mg. stat, 500 mg. q. 12 h. | G | H | J |
| Hours after administration | Blood serum levels for 1st 24 hrs. following administration | Blood serum levels for 2d 24 hrs. following administration | Blood serum levels for 1st 24 hrs. following administration | Blood serum levels for first 24 hours | | Blood serum levels for second 24 hours |
| 1 | .085 | 1.45 | .10 | .03 | 1.1 | 5.5 |
| 2 | .32 | 1.60 | .46 | .07 | 1.1 | 5.2 |
| 5 | .68 | 1.80 | 3.4 | .04 | .55 | 3.9 |
| 8 | .63 | 1.55 | 3.4 | 1.9 | 1.7 | 4.05 |
| 12 | .65 | 1.35 | 3.43 | 1.5 | 1.25 | 3.2 |
| 13 | .85 | 1.38 | 3.43 | 3.35 | 2.6 | 3.4 |
| 14 | .88 | 1.68 | 3.70 | 3.1 | 3.4 | 3.7 |
| 18 | 1.60 | 1.88 | 4.65 | 3.1 | 2.4 | 3.5 |
| 24 | 2.20 | 1·38 | 3.75 | 5.7 | 4.5 | 4.5 |

Random samples were taken and evaluated for patients D and E during the course of treatment and were found to be 1.6, 1.65 and 2.45.

From the above table it can be seen that the blood serum levels can be maintained fairly constant for patients receiving the administration according to the invention, even though administration is spaced over 12 hour periods. Moreover, it is seen that the serum levels are built up to a desired level, even though administration is at 12 hour intervals.

It is also evident that the serum levels are very high after each administration of conventional tetracycline, as shown for patients G and H. Patients J have a serum level about the same as patients F, even though twice as much tetracycline had been administered. It is to be observed that the blood serum levels evaluated for patients G, H and J substantially correspond to those given by Pfizer & Company (a manufacturer of tetracycline) in their clinical testing data.

In all instances of the above clinical study it has been observed that the tetracycline preparation according to the application is effective at half the dosage conventionally administered. Additionally, no adverse side effects have been observed with the composition according to the application, even though administration has lasted for a period which is twice that in which tetracycline is conventionally administered. Furthermore, there has been no discernible difference in the therapeutic capabilities of the tetracycline composition according to the application as compared to conventional tetracycline.

What is claimed is:

1. A pharmaceutical preparation for oral administration comprising a granulate including a complex consisting essentially of an intimate admixture of a tetracycline antibiotic polyvinylpyrrolidone; and a carboxylic acid having a solubility of less than 10 g. per 100 g. of water, said pharmaceutical preparation further comprising a coating on said granulate constituted by polyvinylpyrrolidone and arsenic-free shellac.

2. A pharmaceutical preparation as claimed in claim 1, wherein the weight ratio of antibiotic substance, polyvinylpyrrolidone and carboxylic acid is approximately 10:.10–.20:.10–.20.

3. A pharmaceutical preparation as claimed in claim 2, wherein said carboxylic acid is fumaric acid.

4. A pharmaceutical preparation as claimed in claim 2, wherein each gram of obtained preparation contains between 550 and 600 mg. of antibiotic substance.

5. A pharmaceutical preparation as claimed in claim 1 wherein the tetracycline antibiotic is tetracycline, oxytetracycline, chlorotetracycline, dimethyltetracycline, amino methyl derivatives thereof and salts thereof.

6. A tetracycline antibiotic preparation comprised of a plurality of granules formed into a core of granules, and a plurality of layers of granules, each granule containing a mixture of tetracycline antibiotic, polyvinylpyrrolidone, shellac, and fumaric acid, and a grossing coating over the plurality of layers and core, consisting of polyvinylpyrrolidone and shellac, said grossing coating being free of tetracycline antibiotic and fumaric acid, said core having a higher concentration of tetracycline antibiotic in comparison with said layers, each gram of said granules containing between 500 and 600 mg. of tetracycline, the weight relationship, in said granules, between the tetracycline, and polyvinyl pyrrolidone, and the fumaric acid, being 10:.10–.20:.10–.20.

References Cited

UNITED STATES PATENTS

| 2,809,916 | 10/1957 | Hermblin | 167—82 |
| 2,928,770 | 3/1960 | Bardoni | 167—82 |
| 2,953,497 | 9/1960 | Press | 167—82 |
| 2,954,322 | 9/1960 | Heilig et al. | 167—82 |
| 2,971,889 | 2/1961 | Swintosky | 167—82 |
| 2,991,226 | 7/1961 | Millar et al. | 167—82 |

OTHER REFERENCES

Eisner et al.: "The Enhancement of Serum Levels of Aureomycin in Experimental Animals," J. Pharmacol. & Expt'l Therap. 108: 442–449, August 1953.

SHEP K. ROSE, Primary Examiner

U.S. Cl. X.R.

424—21, 33, 34, 227